US012597067B2

(12) United States Patent
Green et al.

(10) Patent No.: US 12,597,067 B2
(45) Date of Patent: Apr. 7, 2026

(54) ORDER MANAGEMENT SYSTEM FOR IMPROVED LATENCY

(71) Applicant: NASDAQ TECHNOLOGY AB, Stockholm (SE)

(72) Inventors: Anders Green, Stockholm (SE); Lars Baarman, Stockholm (SE)

(73) Assignee: NASDAQ TECHNOLOGY AB, Stockholm (SE)

( * ) Notice: Subject to any disclaimer, the term of this patent is extended or adjusted under 35 U.S.C. 154(b) by 961 days.

(21) Appl. No.: 17/632,621

(22) PCT Filed: Jul. 15, 2020

(86) PCT No.: PCT/SE2020/050735
§ 371 (c)(1),
(2) Date: Feb. 3, 2022

(87) PCT Pub. No.: WO2021/025606
PCT Pub. Date: Feb. 11, 2021

(65) Prior Publication Data
US 2022/0292600 A1      Sep. 15, 2022

Related U.S. Application Data

(60) Provisional application No. 62/883,385, filed on Aug. 6, 2019.

(51) Int. Cl.
*G06Q 40/04* (2012.01)
(52) U.S. Cl.
CPC .................................... *G06Q 40/04* (2013.01)
(58) Field of Classification Search
CPC ............................... G06Q 40/04; G06Q 30/08

USPC .......................................................... 705/37
See application file for complete search history.

(56) References Cited

U.S. PATENT DOCUMENTS

| | | | |
|---|---|---|---|
| 7,483,850 B1 | 1/2009 | Fishbain et al. | |
| 8,296,217 B1* | 10/2012 | Howorka | G06Q 40/06 705/37 |
| 11,301,934 B2* | 4/2022 | Jensen | G06Q 40/04 |
| 12,198,194 B1* | 1/2025 | Isaacson | G06Q 40/04 |
| 2003/0225673 A1* | 12/2003 | Hughes, Jr. | G06Q 40/04 705/37 |
| 2003/0229557 A1* | 12/2003 | Richmann | G06Q 40/04 705/37 |

(Continued)

FOREIGN PATENT DOCUMENTS

WO          2008/156777          12/2008

OTHER PUBLICATIONS

International Search Report for PCT/SE2020/050735 mailed Oct. 29, 2020, 4 pages.

(Continued)

*Primary Examiner* — Hani M Kazimi
(74) *Attorney, Agent, or Firm* — Nixon & Vanderhye PC

(57) ABSTRACT

The technology described herein relates to a system for managing order data for improved latency. In particular, the technology described herein relates to, among other aspects, a system for processing certain types of orders so that the orders may re-attempt matching against orders in an order-book memory thereby preventing different disparate terminal devices from having to resubmit the order data messages.

20 Claims, 7 Drawing Sheets

(56)                    References Cited

U.S. PATENT DOCUMENTS

| | | | |
|---|---|---|---|
| 2005/0171891 A1* | 8/2005 | Daley ................... | G06Q 40/04 |
| | | | 705/37 |
| 2009/0271308 A1* | 10/2009 | Maynard ............... | G06Q 40/00 |
| | | | 705/37 |
| 2010/0082500 A1* | 4/2010 | Lutnick ................. | G06Q 40/04 |
| | | | 705/37 |
| 2010/0268638 A1* | 10/2010 | Wunsch ............ | G06Q 30/0633 |
| | | | 705/37 |
| 2011/0258100 A1 | 10/2011 | Krishna et al. | |
| 2014/0095371 A1* | 4/2014 | Galinov ............... | G06Q 40/04 |
| | | | 705/37 |

OTHER PUBLICATIONS

Written Opinion of the ISA for PCT/SE2020/050735, mailed Oct. 29, 2020, 6 pages.

* cited by examiner

<u>600</u>

| | |
|---|---|
| UnderlyingSecurity | GOLD |
| AssetType | Options |
| ISIN | 02079K107 |
| OrderType | Smart IOC |
| SEDOL | - |
| MaturityDate | 20170721 |
| StrikePrice | 1092.5 |
| PutOrCall | Put |
| Term | - |
| Currency | USD |
| SettlementDate | - |
| SettlementType | - |
| Session | - |
| Price | $10.2 |

ORDER MANAGEMENT SYSTEM FOR IMPROVED LATENCY

This application is the U.S. national phase of International Application No. PCT/SE2020/050735 filed 15 Jul. 2020, which designated the U.S. and claims the benefit of U.S. Provisional Application No. 62/883,385 filed 6 Aug. 2019, the entire contents of each of which are hereby incorporated by reference.

TECHNICAL OVERVIEW

The technology described herein relates to a system for managing order data for improved latency. In particular, the technology described herein relates to, among other aspects, a system for processing certain types of orders so that the orders may re-attempt matching against orders in an orderbook memory thereby preventing different disparate terminal devices from having to resubmit the order data messages.

INTRODUCTION

Technology is available for processing order data messages by matching orders contained in the order data messages with orders stored in an orderbook memory (e.g., of an electronic exchange system). For example, certain systems can extract order data from the order data messages and attempt to match orders with other orders and, in cases where the order does not match, the system can store the received order in the orderbook memory. In some example systems, certain orders that must be processed quickly (e.g., "immediate or cancel" order types) will be attempted to match with other orders and then canceled if the order cannot be matched (or completed in cases where the order matches).

Conventional technology is useful for processing these order data messages. However, it will be appreciated that new and improved techniques, systems, and processes are continually sought after.

COPYRIGHT NOTICE

SUMMARY

The technology described herein addresses the problems in the conventional technology, in part, by providing a system capable of processing certain orders without requiring one or more terminal devices to resubmit unprocessed orders. For example, the technology relates to, among other aspects, processing immediate or cancel ("IOC") order types in a manner that enables the system to re-attempt order matching by "pinging" the orderbook (e.g., after a period of time). In one non-limiting example, the system may attempt to "ping" the orderbook a number of times before canceling a remainder portion of the order. In doing so, the system advantageously allows certain order types (e.g., IOC orders) to be continuously processed by the system without having the terminal devices sending the orders retransmit the orders for processing thereby improving the overall latency of the system.

This Summary is provided to introduce a selection of concepts in a simplified form that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

FIG. 6 shows a non-limiting example diagram of the elements comprising a data message.

DETAILED DESCRIPTION

Figure 1:
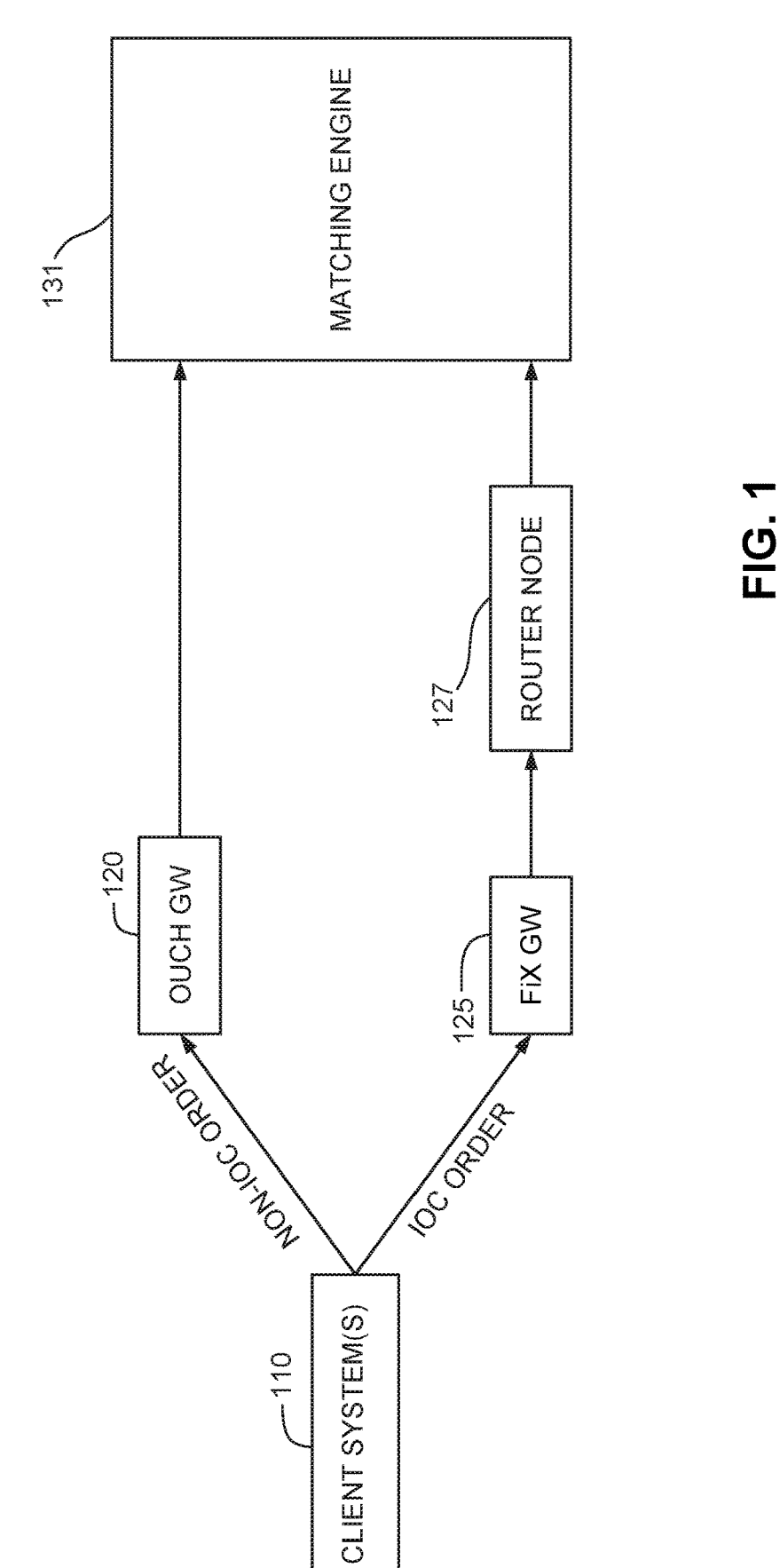
FIG. 1 shows a non-limiting example system 100 for processing order data.

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

The technology described herein relates to, among other topics, a system for processing certain order types in a manner that does not require terminal devices (e.g., broker terminals) from having to retransmit order data messages. In one example, electronic exchange systems allow different entities (e.g., brokers, traders) to conduct exchange of various tradeable instruments (e.g., securities). Once a transaction is initiated from a client terminal of a broker, trader or other entity, the entire series of processes including the matching of buyers and sellers, and the completion of the transaction happens entirely electronically. The computer systems and communication networks that implement these electronic exchange systems enable large numbers (e.g., several hundred thousands to millions) of trades to execute during a trading day. Many of these trades are completed almost instantaneously (e.g., a fraction of a second) upon a buy or sell order being input to the exchange system and/or the input bid or offer prices matching the market price.

In one non-limiting example, the system can process orders from many different orders types. For example, a standard order may attempt to buy/sell a certain amount of a tradeable instrument at a given price (or price range). The system may attempt to match the order (e.g., against orders stored in an orderbook memory of the system) and if the order does not match, any unmatched portion may be retained by the system for future matching.

Certain orders may require the system to match the order immediately. For example, an IOC order is an order related to buy or sell a tradeable instrument that executes all, or part, immediately and cancels any unfilled portion of the order. A traditional IOC order tries to fill the order in one single try, though, IOC orders differ from other duration orders in that they are only able to be filled at one snapshot in time. An IOC order automatically cancels any part of the order that does not fill immediately. Thus, terminal systems wishing to attempt to match any remaining portion of the order are required to resubmit the IOC order again thereby encumbering the network and causing possible system latency issues/inaccuracies. It should be appreciated that IOC orders are not published in the orderbook but the trades coming out of the order are published in real time.

The technology described herein improves upon the conventional approach by, in part, capturing "refills" at best price, which can occur within roughly 120 microseconds after a first order has been filled/matched (statistics indicate this occurs +10% of the time). It should be appreciated that typical replenishment rate can be around 120 microseconds and once the order book is replenished it is published. The technology described herein thus "pings" the order book once with an initial order targeted at fetching as much available volume as possible, and then subsequently waiting a period of time (which can be configurable while taking into account latency issues) and attempting to match the order again (several times in sequence; e.g., three times) over a time frame. (e.g. within max 300 micro seconds). While the technology described herein indicates a period of time in which the system may wait, it should be appreciated that the technology envisions any variety of events that may cause the system to attempt to match an order again including, but not limited to, a specific triggering event.

This technology described herein advantageously benefits all members wanting to trade larger volumes in a pre-trade anonymous environment and can more specifically bring functionality traditionally only available for co-located members to any member. The technology further advantageously reduces the load on the network by reducing the number of incoming order data messages. Moreover, given the likelihood of members submitting larger orders are to receive a higher fill ratio, this technology also entails less requirements for order routing to other venues (e.g., looking to fill what would previously had been partial fills). Such an approach advantageously improves the overall latency of the system (e.g., by reducing the latency).

Figure 2:
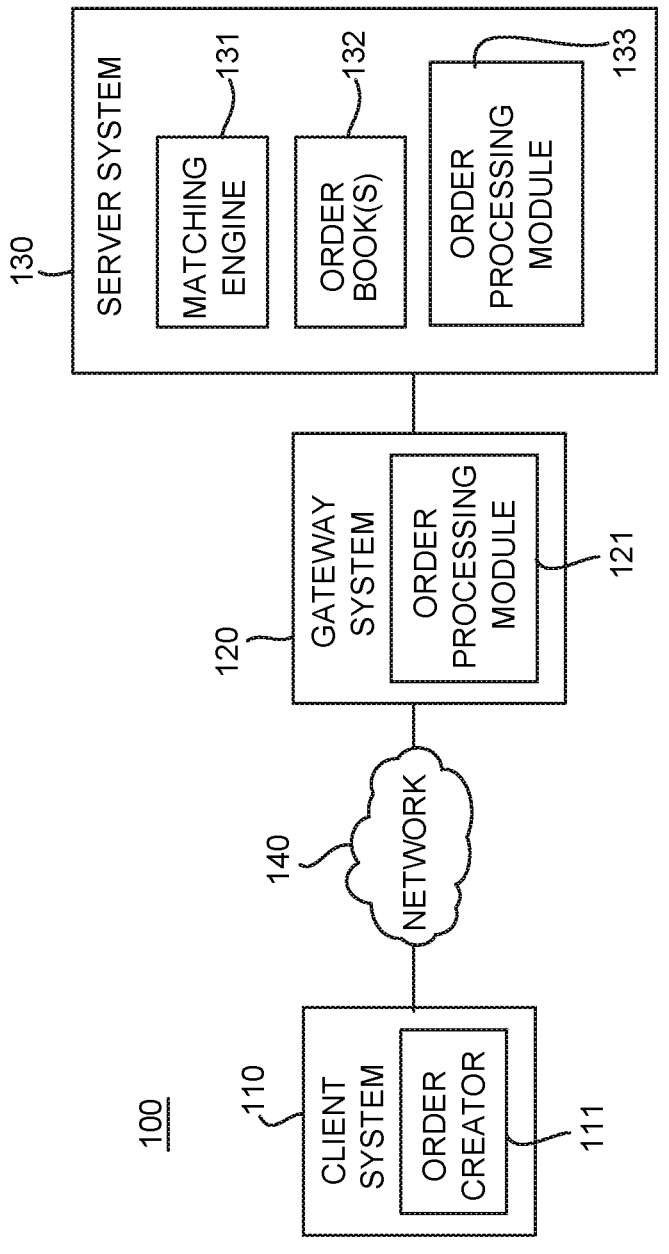
FIG. 2 depicts a non-limiting example block diagram of different software components comprising the system.
Figure 3:
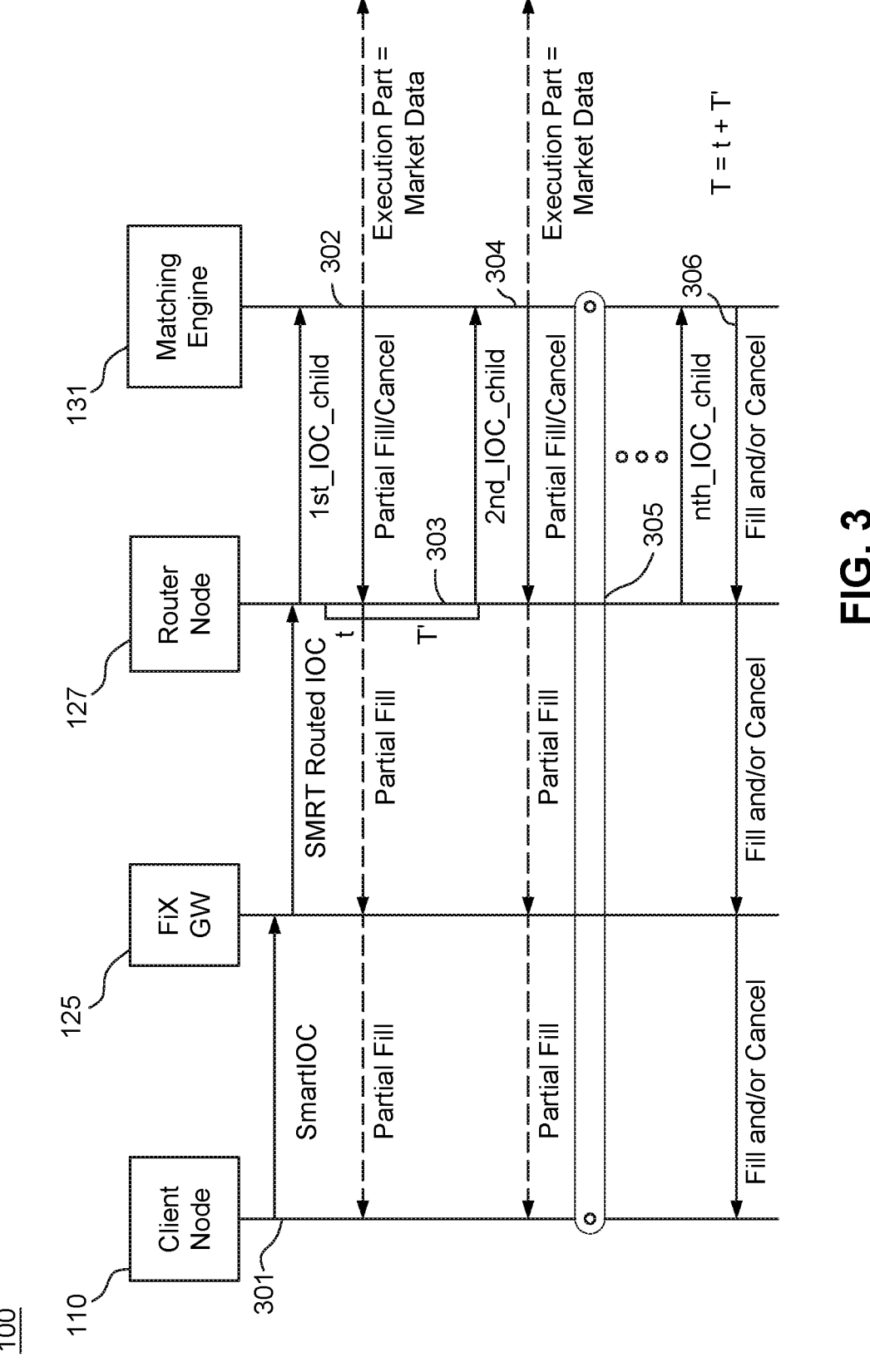
FIG. 3 shows a non-limiting example communication process between devices within the system.
Figure 4:
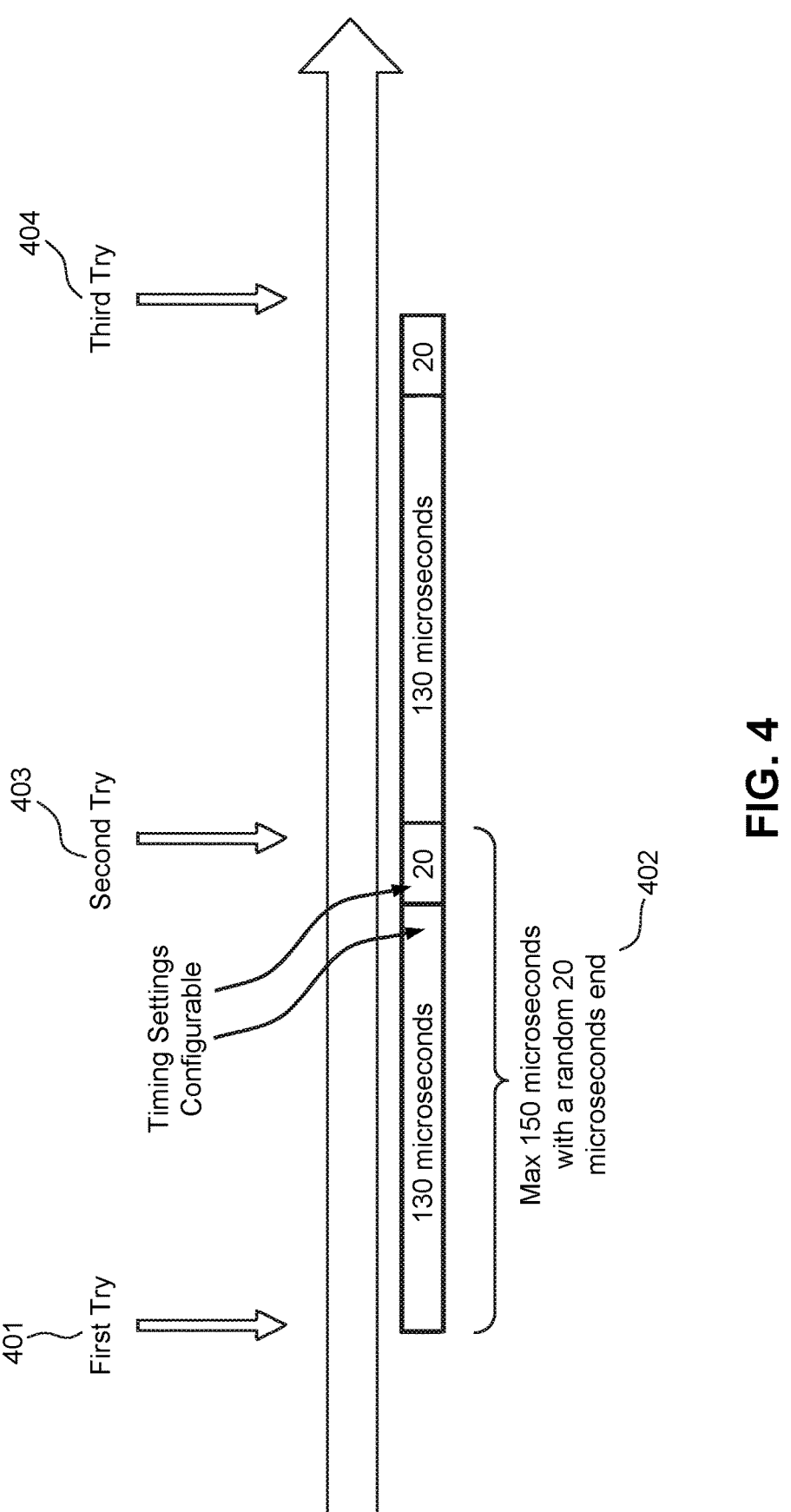
FIG. 4 shows a non-limiting example timing workflow 400 for pinging the orderbook memory 132.
Figure 5:
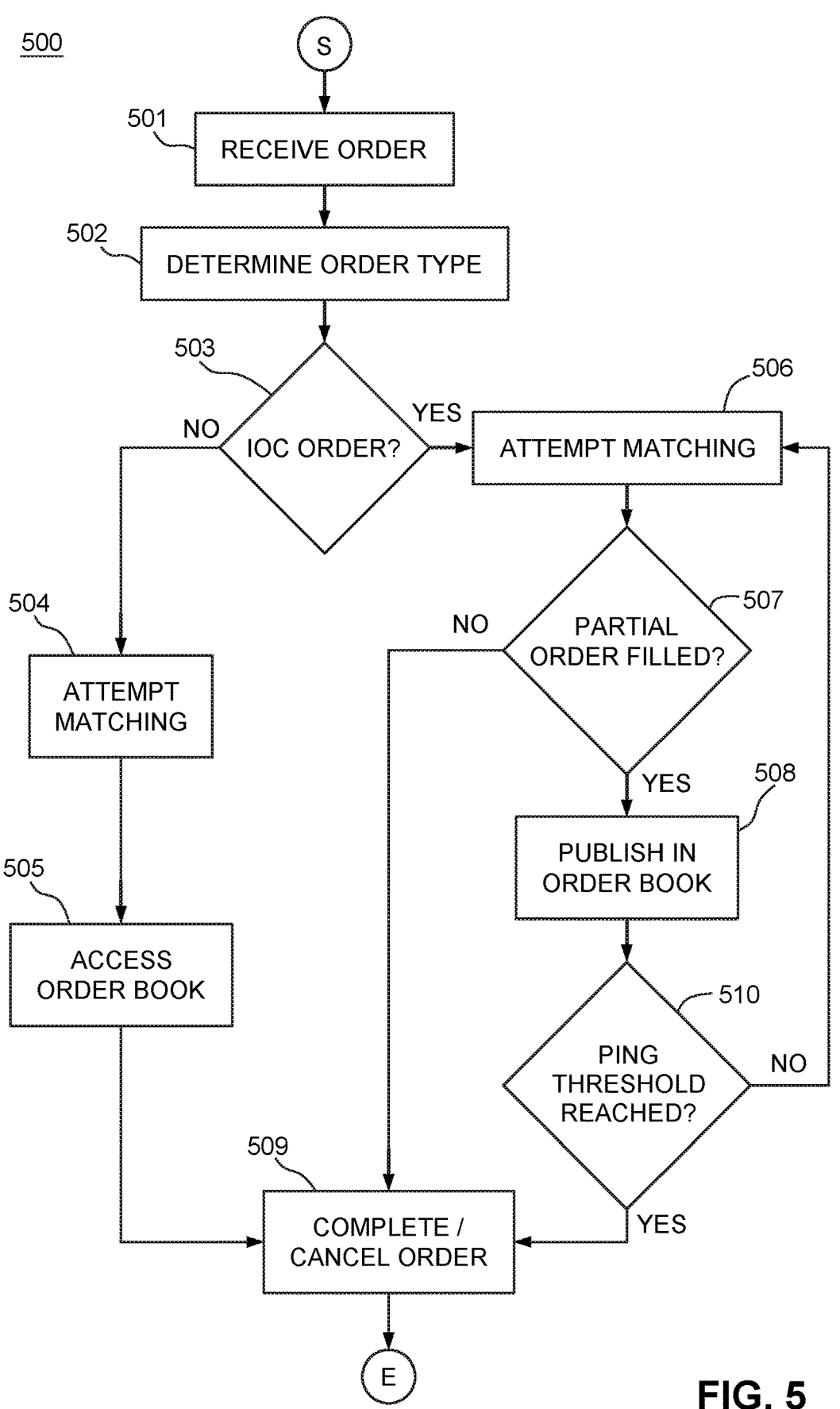
FIG. 5 shows a non-limiting example method carried out by components in the system 100.
Figure 7:
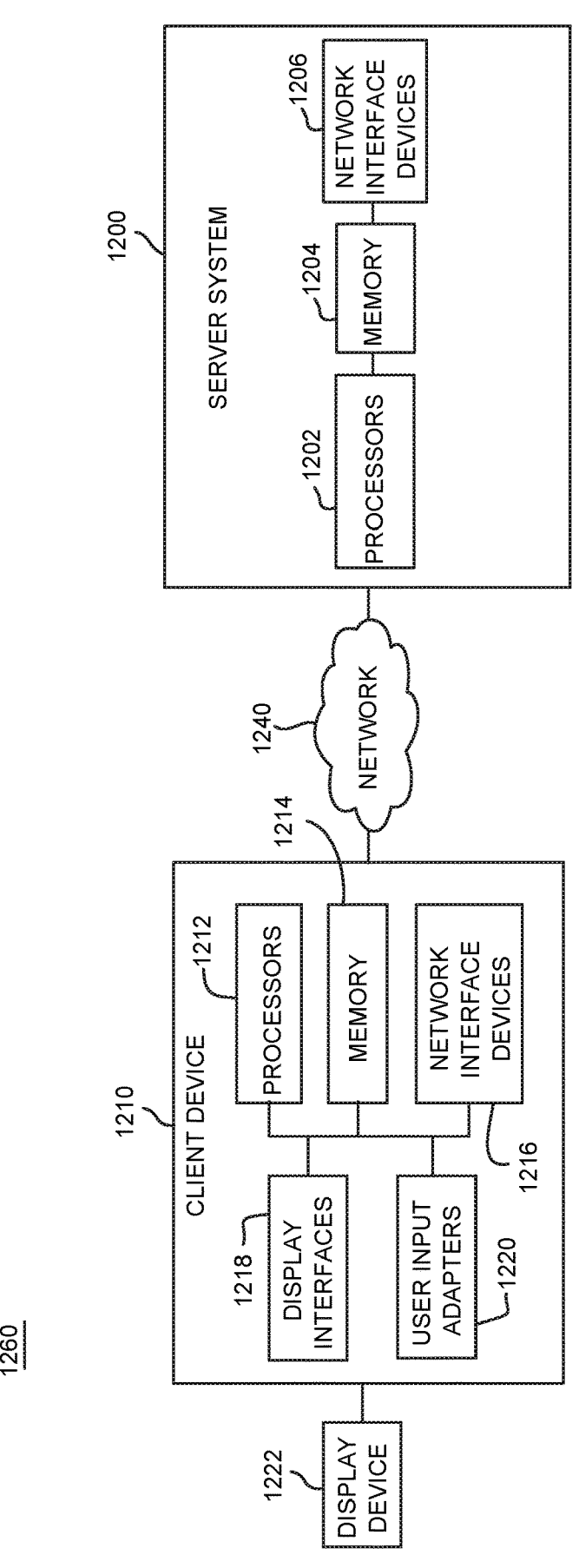
FIG. 7 shows a non-limiting example block diagram of hardware components comprising the system shown, at least, in FIG. 2.

FIG. 1 shows a non-limiting example system 100 for processing order data. FIG. 2 shows different software components comprising the system. FIG. 3 shows a non-limiting example communication process between devices within the system. FIG. 4 shows a non-limiting example timing workflow 400 for pinging the orderbook memory 132. FIG. 5 shows a non-limiting example method carried out by components in the system 100. FIG. 6 shows a non-limiting example diagram of the elements comprising a data message. FIG. 7 shows an example system in which the features described herein may be implemented, wherein hardware aspects of the system are highlighted.

In many places in this document, software modules and actions performed by software modules are described. This is done for ease of description; it should be understood that, whenever it is described in this document that a software module performs any action, the action is in actuality performed by underlying hardware components (such as a processor and a memory) according to the instructions and data that comprise the software module.

Description of FIG. 1

FIG. 1 shows a non-limiting example system 100 for processing order data. The example shown in FIG. 1 depicts the general process for client system(s) 110 submitting different types of orders for matching by matching engine 130. In one non-limiting example, client system(s) 110 may submit certain "standard" orders (e.g., non-IOC orders) for matching via a first gateway (e.g., OUCH gateway 120) where the orders will be submitted to the system for regular processing by the particular gateway protocol. The order may attempt to be matched by matching engine 131 where the matching engine 131 may access an orderbook memory to match the incoming order. If the order is not matched, the system 100 may retain the order by storing the order in the orderbook memory for future processing.

The client system(s) 110 may also submit certain orders requiring immediate processing (e.g., IOC orders). In one non-limiting example, the system(s) 110 may transmit the order data messages to a second gateway (e.g., FiX gateway 125) where the orders can be proceed using the second gateway protocol. In one non-limiting example, the system 100 may employ a router node 127 for routing the order data message to one or more different destinations. For example, the router node 127 may route the order data to different matching engines 131 or other types of exchange systems.

It should be appreciated that the order messages sent by client system(s) 110 may be acknowledged by server systems associated with the matching engine 131 (e.g., by sending one or more acknowledgement messages). Moreover, once part (or all) of an order matches using matching engine 131, the system may send an acknowledgement message at each matching event.

While the system 100 shown in FIG. 1 depicts client system(s) 110 sending different order messages to different gateways depending on the type of order message, the system 100 envisions any variety of methods for handling orders of different type. For example, the system 100 may use an initial gateway for determining where an order may be routed. In one non-limiting example, the system 100 may analyze the data message and determine (e.g., by codes in the data message) that the system should be routed to the first gateway 120 or the second gateway 125. This example is of course non-limiting and the system 100 envisions any variety of methods for routing orders.

It should be appreciated that the components shown in system 100 employ a variety of communication circuitry, as well as processing circuitry that includes input/output devices, data transceivers (for transmission of digital and/or analog signals), one or more processors (e.g., a CPU), one or more storage devices (e.g., a memory), and/or one or more audio/visual components (e.g., sound interface, display). Such components are highlighted and discussed with respect to FIG. 7, below.

Description of FIG. 2

FIG. 2 shows a non-limiting example diagram of a system wherein the framework for processing order data can be implemented. As will be described below, one or more applications that implement the framework for processing order data can be deployed in the system, and the various components in the system shown in FIG. 2 (such as the client system(s) 110, gateway system(s) 120, and/or server system(s) 130) can perform different functions related to the deployed applications.

As will be discussed below, FIG. 2 shows software modules executing at the client system(s) 110, server system(s) 130, and the gateway system(s) 120; it should be understood that the software modules shown in FIG. 2 are stored in and executed by hardware components (such as processors and memories); details regarding example hardware components that may be used to execute these software modules are provided below with reference to FIG. 7, as well as in other places in this document.

One or more client system(s) 110 can be configured to produce data file(s), via an order creator 111, containing data associated with orders generated by system(s) 100 (e.g., as an order data message). The order data message could include an order instruction that can be identified by one or more order specific parameters for the financial instrument to be traded. The order specific parameter for the financial instrument to be traded could include one or more of the following: order type, order price, order size, order time, and/or trading participant identity.

The data file could be an electronic data message and/or a data file formatted for processing by server system(s) 130. For example, the data file could be in the form of an XML file having different tags that are associated with data entries processed by system(s) 120/130. In another example embodiment, the data file could be a flat file having different entries separated by delimiters denoting different fields. In one example, the delimiters could be commas (e.g., a comma separated file). This example is non-limiting and the technology described herein envisions any type of delimiters for separating data elements in the data file. It should be appreciated that client system(s) 110 may be any client system interacting directly or indirectly with gateway system (s) 120 and/or server system(s) 130.

Gateway system(s) 120 are configured to serve as a gateway between the client system(s) 110 and the server system(s) 130. The gateway system(s) 120 can communicate with client system(s) 110 and server system(s) 130 over the network 140. In one non-limiting example, the gateway system(s) 120 can perform a variety of tasks after receiving the data files containing the order data message from client system(s) 110. Order processing module 121 is configured to, among other aspects, perform a variety of pre-processing on an order data message to ensure that the order is acceptable to submit to the server system(s) 130. Moreover, order processing module 121 can, in certain example embodiments, determine if an order data message should be routed via a first gateway (e.g., OUCH gateway) or via a second gateway (e.g., FiX gateway). In one example, order processing module 121 may determine an order type for the order contained in the order data message and, based on the order type, submit the order to a relevant gateway. For example, an IOC order may be submitted to the second gateway for a specific process to be carried out on the order. The details of this determination and processing is discussed with respect to FIGS. 3-6 and throughout this document. It should be appreciated that the gateway system(s) 120 may be incorporated in a separate system from server system(s) 130 or could be integrated into server system(s) 130. Likewise, the system 100 may carry out all of the tasks performed at the gateway system(s) 120 within the server system(s) 130 itself.

Server system(s) 130 are configured to communicate with client system(s) 110 and gateway system(s) 120 (e.g., via network 140). It should be appreciated that the network 140 could comprise a network of interconnected computing devices, such as the Internet. The network 140 could also comprise a local area network (LAN) or could comprise a peer-to-peer connection between the different devices in the system. The server system(s) 130 could comprise any variety of server devices including, but not limited to, database servers, file servers, web servers, application servers, a server cluster (e.g., a cloud-based computing environment), a standalone server, and/or any other portable or stationary computing device having server-based capabilities. It should be appreciated that the server system(s) 130 can be implemented using separately located hardware (e.g., remote hardware) or can be implemented using a same piece of hardware (e.g., within a single housed server device).

Server system(s) 130 can receive the order data messages from client system(s) 110 via the gateway system(s) 120 via network 140. Upon receiving the order data message, the server system(s) 130 can, using order processing module 133, perform various processing on the order data contained in the order data message of the data files. For example, order processing module 133 may, in some embodiments, determine if the order data should be processed under "special" or "regular" processing.

In more detail, the server system(s) 130 may receive an IOC order that requires immediate matching by matching engine 131. Matching engine 131 can attempt to match an order against one or more orders stored in order book(s) 132. For example, an order to purchase a certain amount of shares of a tradeable instrument at a particular price may be compared to orders stored in the order book(s) 132. If an order matches, then the order will "execute" and the order data associated with the order in the order book(s) 132 will be modified to reflect the change after execution. If an order does not match at all, then the order will be "canceled" and a notification will be transmitted to client system(s) 110 advising of the same. In some instances, the order may partially match using matching engine 131 and thus the order processing module 133 may attempt to "ping" the order book(s) 132 after a period of time in order to try and match the remaining amount of the order. This process could be repeated until the order fully matches and if a remaining portion goes unmatched, then system 130 may cancel the remaining portion of the IOC order.

It should be appreciated that the order book(s) 132 may reside in a database memory of server system(s) 130. These database systems may be or include one or more of: a relational database management system (RDBMS); an object-oriented database management system (OODBMS); an object-relational database management system (OR-DBMS); a not-only structured query language (NoSQL) data store; an object cache; a distributed file system; a data cluster (based on technology such as Hadoop); and/or any other appropriate type of data storage system).

It should be appreciated that the components shown in FIG. 2 can be implemented within a single system. The components could also be incorporated in multiple systems and/or a distributed computing environment (e.g., a cloud computing environment). Thus, the system is not limited to a single component and can be incorporated into multiple components.

Description of FIG. 3

FIG. 3 shows a non-limiting example communication process between devices within the system. The communication process shows example communication between at least one client system 100, one gateway 125, one router node 127, and/or one matching engine 131. It should be appreciated that this communication process can be carried out, for example, using network 140.

In the example shown in FIG. 3, the communication process begins when client system 100 transmits a data message for an IOC order (301). As discussed herein, the data message containing the IOC order may be transmitted to gateway 125 (e.g., FiX gateway) where the data message will then be communicated to router node 127. The IOC order will require that the system process the order immediately, or cancel the order if it is unable to process. The router node 127 may submit the IOC order to matching engine 131 where engine 131 will attempt to match part (or all) of the order against other orders stored in the orderbook memory 132. In the example shown in FIG. 3, the IOC order will at least partially fill. However, it should be appreciated that the IOC order may completely fill upon first receipt by matching engine 131 in which the system 100 will publish the trade in orderbook 132 and send acknowledgment back to client system 110 of the trade. The trade may also not fill at all upon first receipt and thus the system 100 will cancel the order and send acknowledgement back to client 110.

If matching engine 131 can partially fill the IOC order, a message can be sent back to client 110 indicating the partial fill (302) and the router node 127 will be notified of the same. After waiting a period of time (T'), the router node 127 will submit the second IOC order containing the amount that was unfilled in the first request (303). In one non-limiting example, the router node 127 may wait about 150 microseconds (e.g., 130 microseconds for usual replenishment rate plus a randomized 20 microsecond buffer). It should be appreciated that the period of time can be determined based on any variety of factors. For example, the period of time can be fixed, randomized, triggered by events in the orderbook or the market, or any combination thereof. It should be appreciated that the period of time should be sufficient for a change or update in the orderbook to have occurred since the previous "pinging" of the orderbook by the order. The update in the orderbook can (but is not required to) occur as a result of potential trades by the order at hand (e.g. the market reacting to the trade or a market participant providing additional liquidity to the market after being executed by the IOC order).

After waiting for the period of time (T'), router node 127 will submit the second request to fill the IOC order where matching engine 131 will attempt to fill the remaining portion (304). It should be appreciated that a "market maker" may increase volume of a tradeable instrument they wish to buy/sell between the transmission of the first IOC order and the second IOC order which would then cause additional quantity of the IOC order to execute in trade. This example is of course non-limiting and the technology envisions any variety of reason for which the IOC order may execute multiple times in system 100.

After the second IOC order partially fills, the matching engine 131 may send acknowledgment of the completed trade and the process for submitting a third (and any subsequent number) of IOC orders for the additionally remaining amount will be repeated (305). That is, the router node 127 may repeat waiting for a period of time (303) before transmitting the IOC order containing the remaining unmatched amount to engine 131 and engine 131 may partially fill part (or all) of the remaining amount of the IOC order (304).

The process above may be repeated continuously until the IOC order fills or may be repeated for a number of attempts before deciding to cancel the remaining portion of the order (306). Of course, the remaining portion of the IOC order may fill entirely within the number of attempts in which case the system 100 will publish the remaining trades in orderbook 132. Any portions of the IOC order that have not been matched may not be stored in orderbook 132.

It should be appreciated that router node 127 may "ping" the orderbook 132 (e.g., by requesting a match via matching engine 131) "n" number of times within a set configurable timeframe in order to increase likelihood of execution. While the technology described herein indicates that the orderbook 132 may be pinged within a certain timeframe, it should be appreciated that the technology is not limited to such an embodiment and envisions any variety of events that could occur causing the orderbook 132 to be pinged. For example, the pinging of orderbook 132 may be alternatively triggered by some type of event (e.g., a market event). The IOC order can be an order condition only to be used on a "Limit" order with a "Limit" price and quantity. It is further possible to configure the "n" number of pings, a waiting time after ping, and/or a randomization time before a next ping. In one non-limiting example, system 100 may be configured to ping the orderbook 132 three times.

Description of FIG. 4

FIG. 4 shows a non-limiting example timing workflow 400 for pinging the orderbook memory 132. The example shown in FIG. 4 depicts three attempts for pinging the orderbook memory before completing (or canceling) the remaining portion of the order. However, it should be appreciated that any number of attempts may be taken by system 100 and the example shown in FIG. 4 is non-limiting.

The workflow 400 begins by attempting a first try 401 for matching an IOC order against orders in the orderbook memory 132. As discussed above, if the IOC order fully matches (or does not match at all) with orders in the orderbook 132, then system 100 will complete (or cancel) the order and send acknowledgement back to the client terminal 110. Thus, it should be appreciated that pinging of the orderbook 132 may only occur if the first try 401 returns a partial fill. Thus, if a trading party is submitting an IOC order with a "Minimum" quantity set to 100% of the volume, the order will only ping once if it does not get the full volume at the first try. If the minimum quantity is set to a lower value (e.g., 20% of the volume), and it is traded in a partial fill on first try 401, the system 100 will re-ping the order. In the example shown in FIG. 4, any remaining residual volume is canceled back after the third attempt.

After the first try 401 executes, the remaining quantity is held back for a configurable time and randomization period 402. In one non-limiting example, the time and randomization period 402 may be set to 150 microseconds (ms) (e.g., 130 microseconds plus a random 20 microsecond end). This example is of course non-limiting and the technology described herein envisions any variety of time periods (or action triggers) that can be used. It should be appreciated that the time period of 150 ms could indicate as to how quickly a party can react to partial execution of an IOC order. That is, the 150 ms time window could reflect how quickly a market may adjust to orders that are being placed in the exchange. It should be further appreciated that the technology may not employ a particular time period but instead attempt matching an order against the orderbook based on any triggering event (e.g., a market triggering event).

After the time period passes, the second try 403 will execute. In this example shown in FIG. 4, the second try 403 for matching the remaining unfilled IOC order against orders in the orderbook memory 132 may only again partially fill against the remaining amount. In this case, the process will wait for the configurable time and randomization period 402 (e.g., 150 ms) before attempting third try 404. After the third try 404 executes, regardless of whether the remaining amount of the IOC order entirely fills, partially fills, or does not fill at all, the system will complete (or cancel) the remaining amount of the IOC order and will only publish the portions that have executed as trades in the orderbook memory 132.

Description of FIG. 5

FIG. 5 shows a non-limiting example method carried out by components in the system 100. FIG. 5 specifically shows a process that can be carried out, for example, by server 130 for processing an order data message received from client 100. At action 501, the server 130 may receive an order data message from client 110. In one non-limiting example, the order data message may come from a data file (e.g., XML file, flat file) where the server 130 (or gateway) may parse the data file and extract elements for processing an order.

Once received (and processed) by server 130, the server 130 may determine the type of order contained in the order date message (at action 502). In one non-limiting example, the order type may be any variety of type but the example used herein depicts an IOC order or a non-IOC order (e.g., a "standard" order for exchange). If the server 130 determines that the order is not an IOC order (at action 503), the server 130 may use matching engine 131 to attempt to match all (or part) of the order against orders in orderbook 132 (at action 504). Whether the order matches, the server 130 can access the orderbook 132 (at action 505) and store the completed trade (or the order) in the orderbook 132 of server 130. The server 130 (at action 509) can complete the order by, for example, sending an acknowledgement to client terminal 110 that the order has processed/completed.

If server 130 determines that the order is an IOC order (at action 503), the server 130 can attempt matching part (or all) of the order (at action 506) against one or more orders in the orderbook 132. If all (or none) of the IOC order is filled (at action 507), the server 130 can complete (or cancel) the order (at action 509). For example, the server 130 may publish the trade in orderbook 132 and send an acknowledgement to client terminal 110 that the order has completed (or been canceled).

If part of the IOC order is filled, the server 130 can publish the trade in the orderbook memory 132 (at action 508). As discussed herein, an IOC order may only publish in orderbook memory 132 if part (or all) of the trade executes. Otherwise, the IOC order would not be stored in the orderbook memory 132 (as the order is designed to be executed immediately or not at all).

At action 510, the server 130 can determine if the ping threshold (e.g., for pinging orderbook 132) has been reached. As discussed herein, the system 100 may set a specified number as a threshold amount for pinging orderbook 132 for any portion of an IOC order that remains unfilled. In the examples described herein, the server 130 may determine that any number of attempts beyond three attempts constitutes exceeding the threshold. It should be appreciated that this example is of course non-limiting and the system can use any method for determining the threshold including, but not limited to, variably setting the threshold. If the server 130 determines that the threshold has not been reached, the process may return to action 506 where the remaining unfilled portion of the order will be attempted to match against other orders in orderbook memory 132.

If the threshold has been reached, server 130 can proceed to action 509 where server 130 can complete the order (or cancel any remaining unfilled portion of the order). At action 509, server 130 may send an acknowledgement message to client 110 indicating that the remaining portion of the IOC order has been canceled. This example is of course non-limiting and server 130 may send any type of message to client 110 including, but not limited to, a summary message indicating how many trades have executed on the IOC order. It should be appreciated that the technology described herein indicates that a cancel event will occur after the threshold has been reached and the order has not fully processed. However, this example is of course non-limiting and the technology envisions any variety of action other than a "cancel event" occurring.

It should be understood that, although actions 501-510 are described above as separate actions with a given order, this is done for ease of description. It should be understood that, in various embodiments, the above-mentioned actions may be performed in various orders; alternatively or additionally, portions of the above-described actions 501-510 may be interleaved and/or performed concurrently with portions of the other actions 501-510.

Description of FIG. 6

FIG. 6 shows a non-limiting example diagram of the elements comprising a data message. FIG. 6 shows an example data message 600 containing elements associated with a trade for a tradeable instrument associated with an IOC order. The data message 600 could contain one or more fields where each field may be populated with information associated with the field. In the example shown in FIG. 6, the data message contains field UnderlyingSecurity 601 associated with the underlying security being traded, and AssetType 602 associated with the type of asset being traded.

The data message 600 may also include an International Securities Identification Number ISIN 603, an OrderType 604 identifying the specific type of order, and a Stock Exchange Daily Office List identifier SEDOL 605. In the example shown in FIG. 6, the OrderType 604 indicates "SmartOC" denoting that the order should be handled for IOC processing as described herein. In one non-limiting example, system 100 (e.g., at a gateway) may parse the data message 600 and identify the order type (e.g., from field OrderType 604) in order to determine which gateway is appropriate for order processing. This example is of course non-limiting and the system can employ any type of method for determining how the order should be processed including each client terminal 110 sending the order directly to a relevant gateway based on the specific order type. The data message 600 may also include a MaturityDate 606 for a date that the given instrument will mature and a StrikePrice 607 indicating a price for which the instrument may be exercised.

The data message 600 may further include a flag for whether the instrument is a "Put" or "Call" via PutOrCall 608 thus identifying whether the owner or holder has the right to sell or buy shares of the instrument, respectively. The data message 600 may also include Term 609 indicative of a duration or term associated with the instrument for this particular trade. The message 600 may further include Currency 610 which can be used to identify the specific currency associated with the tradeable instrument (e.g., U.S. dollars, Japanese yen, Euro).

The data message 600 may contain further information including a SettlementDate 611 and SettlementType 612 associated with a date and type in which the instrument is delivered. In one example, the SettlementType 612 may include "traditional" physical settlement (e.g., payment by paper check) or could include electronic settlement. The data message 600 may further include a session identifier Session 613 and Price 614 indicative of a session and price associated with the tradeable instrument.

In the example of FIG. 6, one or more elements in the data message may not be available as the pieces of information associated with a respective field. For example, items such as SEDOL 605 and Term 609 may not be included as available elements in the data message 600 (i.e., the items of information associated with those fields returns an empty or "NULL" value). Likewise, certain items of information will be available that the system can utilize in determining candidate symbols.

In the example of FIG. 6, UnderlyingSecurity 601, Asset-Type 602, ISIN 603, OrderType 604, MaturityDate 606, StrikePrice 607, PutOrCall 608, Currency 610, and Price 614 are items of information available from message 600. In this example, the data message 600 indicates that the underlying instrument is "Gold" options having a price of $10.20 U.S. dollars. The instrument also has an associated ISIN "02079K107" and is flagged as a "Put" option with a strike price of $1,092.50 and maturity date of Jul. 21, 2017.

Description of FIG. 7

FIG. 7 shows a non-limiting example block diagram of a hardware architecture for the system 1260. In the example shown in FIG. 7, the client device 1210 communicates with a server system 1200 via a network 1240. The network 1240 could comprise a network of interconnected computing devices, such as the internet. The network 1240 could also comprise a local area network (LAN) or could comprise a peer-to-peer connection between the client device 1210 and the server system 1200. As will be described below, the hardware elements shown in FIG. 7 could be used to implement the various software components and actions shown and described above as being included in and/or executed at the client device 1210 and server system 1200.

In some embodiments, the client device 1210 (which may also be referred to as "client system" herein) includes one or more of the following: one or more processors 1212; one or more memory devices 1214; one or more network interface devices 1216; one or more display interfaces 1218; and one or more user input adapters 1220. Additionally, in some embodiments, the client device 1210 is connected to or includes a display device 1222. As will explained below, these elements (e.g., the processors 1212, memory devices 1214, network interface devices 1216, display interfaces 1218, user input adapters 1220, display device 1222) are hardware devices (for example, electronic circuits or combinations of circuits) that are configured to perform various different functions for the computing device 1210.

In some embodiments, each or any of the processors 1212 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 1212 uses an instruction set architecture such as x86 or Advanced RISC Machine (ARM).

In some embodiments, each or any of the memory devices 1214 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 1212). Memory devices 1214 are examples of non-volatile computer-readable storage media.

In some embodiments, each or any of the network interface devices 1216 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 1218 is or includes one or more circuits that receive data from the processors 1212, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 1222, which displays the image data. Alternatively or additionally, in some embodiments, each or any of the display interfaces 1218 is or includes, for example, a video card, video adapter, or graphics processing unit (GPU).

In some embodiments, each or any of the user input adapters 1220 is or includes one or more circuits that receive and process user input data from one or more user input devices (not shown in FIG. 7) that are included in, attached to, or otherwise in communication with the client device 1210, and that output data based on the received input data to the processors 1212. Alternatively or additionally, in some embodiments each or any of the user input adapters 1220 is or includes, for example, a PS/2 interface, a USB interface, a touchscreen controller, or the like; and/or the user input adapters 1220 facilitates input from user input devices (not shown in FIG. 7) such as, for example, a keyboard, mouse, trackpad, touchscreen, etc. . . . .

In some embodiments, the display device 1222 may be a Liquid Crystal Display (LCD) display, Light Emitting Diode (LED) display, or other type of display device. In embodiments where the display device 1222 is a component of the client device 1210 (e.g., the computing device and the display device are included in a unified housing), the display device 1222 may be a touchscreen display or non-touchscreen display. In embodiments where the display device 1222 is connected to the client device 1210 (e.g., is external to the client device 1210 and communicates with the client device 1210 via a wire and/or via wireless communication technology), the display device 1222 is, for example, an external monitor, projector, television, display screen, etc. . . . .

In various embodiments, the client device 1210 includes one, or two, or three, four, or more of each or any of the above-mentioned elements (e.g., the processors 1212, memory devices 1214, network interface devices 1216, display interfaces 1218, and user input adapters 1220). Alternatively or additionally, in some embodiments, the client device 1210 includes one or more of: a processing system that includes the processors 1212; a memory or storage system that includes the memory devices 1214; and a network interface system that includes the network interface devices 1216.

The client device 1210 may be arranged, in various embodiments, in many different ways. As just one example, the client device 1210 may be arranged such that the processors 1212 include: a multi (or single)-core processor; a first network interface device (which implements, for example, WiFi, Bluetooth, NFC, etc. . . . ); a second network interface device that implements one or more cellular communication technologies (e.g., 3G, 4G LTE, CDMA, etc. . . . ); memory or storage devices (e.g., RAM, flash memory, or a hard disk). The processor, the first network interface device, the second network interface device, and the memory devices may be integrated as part of the same SOC (e.g., one integrated circuit chip). As another example, the client device 1210 may be arranged such that: the processors 1212 include two, three, four, five, or more multi-core processors; the network interface devices 1216 include a first network interface device that implements Ethernet and a second network interface device that implements WiFi and/or Bluetooth; and the memory devices 1214 include a RAM and a flash memory or hard disk.

Server system 1200 also comprises various hardware components used to implement the software elements for server system 200 of FIG. 2. In some embodiments, the server system 1200 (which may also be referred to as "server device" herein) includes one or more of the following: one or more processors 1202; one or more memory devices 1204; and one or more network interface devices 1206. As will explained below, these elements (e.g., the processors 1202, memory devices 1204, network interface devices 1206) are hardware devices (for example, electronic circuits or combinations of circuits) that are configured to perform various different functions for the server system 1200.

In some embodiments, each or any of the processors 1202 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 1202 uses an instruction set architecture such as x86 or Advanced RISC Machine (ARM).

In some embodiments, each or any of the memory devices 1204 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 1202). Memory devices 1204 are examples of non-volatile computer-readable storage media.

In some embodiments, each or any of the network interface devices 1206 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In various embodiments, the server system 1200 includes one, or two, or three, four, or more of each or any of the above-mentioned elements (e.g., the processors 1202, memory devices 1204, network interface devices 1206). Alternatively or additionally, in some embodiments, the server system 1200 includes one or more of: a processing system that includes the processors 1202; a memory or storage system that includes the memory devices 1204; and a network interface system that includes the network interface devices 1206.

The server system 1200 may be arranged, in various embodiments, in many different ways. As just one example, the server system 1200 may be arranged such that the processors 1202 include: a multi (or single)-core processor; a first network interface device (which implements, for example, WiFi, Bluetooth, NFC, etc. . . . ); a second network interface device that implements one or more cellular communication technologies (e.g., 3G, 4G LTE, CDMA, etc. . . . ); memory or storage devices (e.g., RAM, flash memory, or a hard disk). The processor, the first network interface device, the second network interface device, and the memory devices may be integrated as part of the same SOC (e.g., one integrated circuit chip). As another example, the server system 1200 may be arranged such that: the processors 1202 include two, three, four, five, or more multi-core processors; the network interface devices 1206 include a first network interface device that implements Ethernet and a second network interface device that implements WiFi and/or Bluetooth; and the memory devices 1204 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the client device 210 or the server system 200, each of which will be referred to individually for clarity as a "component" for the remainder of this paragraph, are implemented using an example of the client device 1210 or the server system 1200 of FIG. 7. In such embodiments, the following applies for each component: (a) the elements of the client device 1210 shown in FIG. 7 (i.e., the one or more processors 1212, one or more memory devices 1214, one or more network interface devices 1216, one or more display interfaces 1218, and one or more user input adapters 1220) and the elements of the server system 1200 (i.e., the one or more processors 1202, one or more memory devices 1204, one or more network interface devices 1206), or appropriate combinations or subsets of the foregoing, are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the respective memory devices (e.g., in various embodiments, in a volatile memory device such as a RAM or an instruction register and/or in a non-volatile memory device such as a flash memory or hard disk) and all actions described herein as performed by the software modules are performed by the respective processors in conjunction with, as appropriate, the other elements in and/or connected to the client device 1210 or server system 1200; (c) alternatively or additionally, to the extent it is described herein that the component processes and/or otherwise handles data, in some embodiments, such data is stored in the respective memory devices (e.g., in some embodiments, in a volatile memory device such as a RAM and/or in a non-volatile memory device such as a flash memory or hard disk) and/or is processed/handled by the respective processors in conjunction, as appropriate, the other elements in and/or connected to the client device 1210 or server system 1200; (d) alternatively or additionally, in some embodiments, the respective memory devices store instructions that, when executed by the respective processors, cause the processors to perform, in conjunction with, as appropriate, the other elements in and/or connected to the client device 1210 or server system 1200, each or any combination of actions described herein as performed by the component and/or by any software modules described herein as included within the component.

The hardware configurations shown in FIG. 7 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 7, (e) via other hardware arrangements, architectures, and configurations, and/or via combinations of the technology described in (a) through (e).

Technical Advantages of Described Subject Matter

The technology described herein also allows for efficient processing of data messages that improves the overall communication ability of the system. In particular, the system processes certain order data message (e.g., "immediate or cancel" orders) in a manner that allows the order to have multiple chances for fill opportunities before portions of the order are canceled. In doing so, the terminal devices that submitted the orders do not need to re-transmit order data messages that did not have the opportunity to fill upon the initial submission. As such, the system reduces a significant number of unnecessary order data messages that are communicated between devices thus improving the overall latency of the system.

Selected Definitions

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can" or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Further Applications of Described Subject Matter

Although a number of references are made in this document to web applications, it should be understood that the features described herein may also be used, in various embodiments, in the context of other types of applications such as applications that are deployed/installed as binaries on client systems.

Although process steps, algorithms or the like, including without limitation with reference to FIGS. 1-7, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A system configured to process order data, the system comprising:

a processor; and a memory configured to store computer readable instructions that, when executed by the processor, cause the system to:

receive an order data message from a client device, wherein the order data message contains a data fie including data elements associated with an order;

parse the data file in the order data message and extract the data elements associated with the order;

identify an order type based on an order type element extracted from the data elements;

in association with the order type being a non-immediate-or-cancel (IOC) order:

forward the extracted data elements, associated with the order, to a first gateway operating under a first protocol;

access an orderbook memory having one or more data records associated with one or more orders;

attempt to match the order against the one or more data records associated with the one or more orders stored in the orderbook memory;

process the order in associated with the order matching against the one or more orders and publish the completed order in the orderbook memory; and store the order in the orderbook memory in association with the order not matching against the one or more orders, in association with the order type being an IOC order:

forward the extracted data elements, associated with the order, to a second gateway operating under a second protocol;

submit a first request to fill the IOC order by attempting to match at least a portion of the order against the one or more data records associated with the one or more orders stored in the orderbook memory;

upon matching the portion of the order:

wait a first period of time after the portion of the order has attempted to match against the one or more data records associated with the one or more orders, wherein the first period of time includes a standard replenishment rate plus a randomized buffer;

after waiting the first period of time, submit a second request to fill the IOC order for matching a remaining amount from the order;

attempt to match the remaining amount from the order against the one or more data records associated with the one or more orders stored in the orderbook memory;

upon successfully matching the remaining amount from the order, publish the completed order in the orderbook memory; and upon unsuccessfully matching the remaining amount from the order, repeat waiting the first period of time and submit a third request to fill the IOC order after waiting the first period of time.

2. The system of claim 1, wherein the remaining amount of the order is canceled after a number of matching attempts has been reached.

3. The system of claim 1, wherein the portion of the order, that has matched against the one or more orders, is stored in the orderbook memory and published in the orderbook memory as completed orders, and the remaining amount of the order is posted to the orderbook memory.

4. The system of claim 1, wherein the system is further caused to wait for a triggering event before attempting to match the remaining amount from the order.

5. The system of claim 1, wherein the orderbook is pinged for a specified number of attempts during a predetermined window of time.

6. The system of claim 1, wherein the first period of time is configurable.

7. The system of claim 1, wherein the orderbook memory is configured to be pinged without requiring resubmission of the order data message from the client device.

8. The system of claim 1, wherein the system is further caused to:

determine if a minimum quantity in the portion of the order satisfies a specified condition; and attempt to match the portion of the order when the minimum quantity satisfies the specified condition.

9. A method for processing order data, comprising:

at an information processing system having a memory and a processor:

receiving an order data message having a data file including data elements associated with an order;

parsing the data file in the order data message and extracting the data elements associated with the order, identifying an order type based on an order type element extracted from the data elements;

in association with the order type being a non-imme-
diate-or-cancel (IOC) order:
  forwarding the extracted data elements, associated
    with the order, to a first gateway operating under
    a first protocol;
  accessing an orderbook memory having one or more
    data records associated with one or more orders;
  attempting to match the order against the one or
    more data records associated with the one or more
    orders stored in the orderbook memory;
  processing the order in association with the order
    matching against the one or more orders and
    publishing the completed order in the orderbook
    memory; and
  storing the order in the orderbook memory in asso-
    ciation with the order not matching against the one
    or more orders, and
in association with the order type being an IOC order:
  forwarding the extracted data elements, associated
    with the order, to a second gateway operating
    under a second protocol;
  submitting a first request to fill the IOC order by
    attempting to match a portion of the order against
    the one or more data records associated with
    orders stored in an orderbook memory;
  upon matching the portion of the order:
    waiting a first period of time after the portion of
      the order has attempted to match against the one
      or more data records associated, with the one or
      more orders, wherein the first period of time
      includes a standard replenishment rate plus a
      randomized buffer;
    after waiting the first period of time, submitting a
      second request to fill the IOC order for match-
      ing a remaining amount of the order; and
    attempting to match the remaining amount of the
      order against the one or more data records
      associated with the orders stored in the order-
      book memory;
  upon successfully matching the remaining amount
    from the order, publishing the completed order in the
    orderbook memory; and
  upon unsuccessfully matching the remaining amount
    from the order, repeating waiting the first period of
    time and submit a third request to fill the IOC order
    after waiting the first period of time.
10. The method of claim 9, further comprising:
determining if a minimum quantity in the portion of the
  order satisfies a specified condition; and
attempting to match the portion of the order when the
  minimum quantity satisfies the specified condition.
11. The method of claim 9, wherein the orderbook is
pinged for a specified number of attempts during a prede-
termined window of time.
12. The method of claim 9, wherein
the portion of the order, that has matched against the one
  or more orders, is stored in the orderbook memory and
  published in the orderbook memory as completed
  orders, and
the remaining amount of the order is posted to the
  orderbook memory.
13. The method of claim 9, further comprising:
waiting for a triggering event before pinging the order-
  book for matching the remaining amount from the
  order.
14. A non-transitory computer readable storage medium
configured to store computer readable instructions that, when executed by a processor of an information processing
system, cause the information processing system to provide
execution comprising:
  receiving an order data message having a data file includ-
    ing data elements associated with an order;
  parsing the data file in the order data message and
    extracting the data elements associated with the order;
  identifying an order type based on an order type element
    extracted from the data elements;
  in association with the order type being a non-immediate-
    or-cancel (IOC) order:
    forwarding the extracted data elements, associated with
      the order, to a first gateway operating under a first
      protocol;
    accessing an orderbook memory having one or more
      data records associated with one or more orders;
    attempting to match the order against the one or more
      data records associated with the one or more orders
      stored in the orderbook memory;
    processing the order in associated with the order match-
      ing against the one or more orders and publishing the
      completed order in the orderbook memory; and
    storing the order in the orderbook memory in associa-
      tion with the order not matching against the one or
      more orders, and
  in association with the order type being an IOC order:
    forwarding the extracted data elements, associated with
      the order, to a second gateway operating under a
      second protocol;
    submitting a first request to fill the IOC order by
      attempting to match a portion of the order against the
      one or more data records associated with orders
      stored in an orderbook memory;
    upon matching the portion of the order:
      waiting a first period of time after the portion of the
        order has attempted to match against the one or more
        data records associated with the one or more orders,
        wherein the first period of time includes a standard
        replenishment rate plus a randomized buffer;
      after waiting the first period of time, submitting a
        second request to fill the IOC order for matching the
        remaining amount of the order;
      attempting to match the remaining amount of the order
        against the one or more data records associated with
        the orders stored in the orderbook memory;
      upon successfully matching the remaining amount
        from the order, publishing the completed order in the
        orderbook memory; and
      upon unsuccessfully matching the remaining amount
        from the order, repeating waiting the first period of
        time and submit a third request to fill the IOC order
        after waiting the first period of time.
15. The non-transitory computer readable storage medium
of claim 14, wherein the system is further caused to provide
execution comprising:
  determining if a minimum quantity in the portion of the
    order satisfies a specified condition; and
  attempting to match the portion of the order when the
    minimum quantity satisfies the specified condition.
16. The non-transitory computer readable storage medium
of claim 14, wherein
  the portion of the order, that has matched against the one
    or more orders, is stored in the orderbook memory and
    published in the orderbook memory as completed
    orders, and
  the remaining amount of the order is posted to the
    orderbook memory.

17. The non-transitory computer readable storage medium of claim 14, wherein the system is further caused to provide execution comprising:

waiting for a triggering event before pinging the order-book for matching the remaining amount from the order.

18. The system of claim 1, wherein the first gateway node is an OUCH gateway node operating with an OUCH protocol.

19. The system of claim 1, wherein the second gateway node is a FiX gateway node operating with a FiX protocol.

20. The system of claim 1, wherein the order is matched against the one or more data records based on matching of, at least, an order item, order price, and an order asset type extracted from the data elements against the corresponding one or more data records.

\*  \*  \*  \*  \*